(12) United States Patent
Tanoue et al.

(10) Patent No.: US 12,286,384 B2
(45) Date of Patent: *Apr. 29, 2025

(54) PLANT GROWTH PROMOTER

(71) Applicant: KAO CORPORATION, Tokyo (JP)

(72) Inventors: Akihiro Tanoue, Wakayama (JP); Yuji Maruno, Wakayama (JP)

(73) Assignee: KAO CORPORATION, Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 17/991,959

(22) Filed: Nov. 22, 2022

(65) Prior Publication Data
US 2023/0088306 A1 Mar. 23, 2023

Related U.S. Application Data

(62) Division of application No. 16/651,986, filed as application No. PCT/JP2018/038518 on Oct. 16, 2018, now abandoned.

(30) Foreign Application Priority Data

Oct. 17, 2017 (JP) ................................ 2017-200920

(51) Int. Cl.
*C05F 11/10* (2006.01)
*A01G 7/06* (2006.01)

(52) U.S. Cl.
CPC ................ *C05F 11/10* (2013.01); *A01G 7/06* (2013.01)

(58) Field of Classification Search
CPC ........... C05F 11/10; A01G 7/06; A01G 22/00; A01G 22/05; A01G 22/15; A01G 22/20; A01G 22/22; A01G 22/25; A01G 22/60; A01G 24/25; A01N 65/00
See application file for complete search history.

(56) References Cited

U.S. PATENT DOCUMENTS

| | | | | |
|---|---|---|---|---|
| 4,018,591 A * | 4/1977 | Buttarelli | ................. | C05D 9/02 71/64.08 |
| 11,632,960 B2 * | 4/2023 | Tanoue | .................... | A01G 7/06 504/116.1 |
| 2009/0126433 A1 | 5/2009 | Piskorz et al. | | |
| 2009/0220767 A1 | 9/2009 | Schlogl | | |
| 2009/0321025 A1 | 12/2009 | Weightman et al. | | |
| 2015/0005484 A1 | 1/2015 | Kubo | | |
| 2015/0041083 A1 * | 2/2015 | Yoshikawa | ............ | D21B 1/303 162/19 |
| 2020/0045983 A1 | 2/2020 | Tsuno et al. | | |

FOREIGN PATENT DOCUMENTS

| | | |
|---|---|---|
| CA | 3055061 | 9/2018 |
| CN | 101304945 A | 11/2008 |
| CN | 101440026 A | 5/2009 |
| CN | 103159526 A | 6/2013 |
| CN | 104292342 A | 1/2015 |
| CN | 104987165 A | 10/2015 |
| CN | 105918364 A | 9/2016 |
| CN | 107197883 A | 9/2017 |
| EP | 0952201 | 10/1999 |
| JP | 61-289820 A | 12/1986 |
| JP | 9-302340 A | 11/1997 |
| JP | 11-50052 A | 2/1999 |
| JP | 2000023560 A | 1/2000 |
| JP | 2003192484 A | 7/2003 |
| JP | 2003321304 A | 11/2003 |
| JP | 2004285033 A | 10/2004 |
| MY | 158282 A | 9/2016 |
| WO | WO-2018159393 A1 | 9/2018 |

OTHER PUBLICATIONS

Gemco Energy. "Palm Kernel Shell Pelletizing Plant" <https://www.pelletmillsolution.com/biomass-materials/Palm-Kernel-Shell-Pelletizing-Plant.html> Nov. 13, 2015 (Year: 2015).*
Combined Chinese Office Action and Search Report issued Sep. 3, 2021 in Patent Application No. 201880066572.6 (with English translation of the Office Action), 9 pages.
"Fine Chemical Intermediates", China Ocean Press, Jan. 2008, pp. 306--307.
"Physical Chemistry", China Environmental Science Press, Aug. 2014, pp. 374-375.
Combined Chinese Office Action and Search Report issued Feb. 1, 2021 in Patent Application No. 201880066572,6 (with partial English translation and English translation of Categories).
"Encyclopedia of New Rural Breeding Techniques", chief editor Tang Liping, Tianjin Chemical Technology Press, Aug. 2015, pp. 614-618 (with partial English translation).
Combined Chinese Office Action and Search Report issued Apr. 27, 2022 in Patent Application No. 201880066572.6 (with partial English translation of the Office Action), 11 pages.
Genwang Zhang et al., "Comprehensive Utilization of Vegetable Oil By-Products", Henan Science and Technology Press, Dec. 1982, pp. 252-255 (with partial English translation).
Li Jialiang, "Introduction to the Environmental Engineering Freshman Seminar". China University of Mining and Technology Press., Jul. 2017, pp. 110-115 (with partial English translation).
Wang Duoren et al, "Green pesticide and fertilizer intermediates". Chemical Technology Literature Press, Apr. 2009, pp. 232-237 (with partial English translation).
Alengaram, U. Johnson, et al. "Effect of aggregate size and proportion on strength properties of palm kernel shell concrete." International Journal of Physical Sciences 5.12 (2010): 1848-1856. (Year: 2010).
Fono-Tamo, R. S., and Olufemi A. Kaya. "Characterisation of pulverised palm kernel shell for sustainable waste diversification." (2013). (Year: 2013).
GGL. "GGL for Palm Kernel Shells (PKS)" <https://greengoldlabel.com/2020/06/23/ggl-for-palm-kernel-shells-pks/> Jun. 23, 2020 (Year: 2020).

(Continued)

*Primary Examiner* — Jennifer A Smith
(74) *Attorney, Agent, or Firm* — Element IP, PLC.

(57) ABSTRACT

The present invention is a plant growth promoter containing a lignocellulosic biomass, wherein the lignocellulosic biomass has a lignin content of 40% by mass or more and 60% by mass or less and a contact angle with water of 50° or less.

11 Claims, No Drawings

(56) References Cited

OTHER PUBLICATIONS

Okoroigwe, Edmund C., Christopher M. Saffron, and Pascal D. Kamdem. "Characterization of palm kernel shell for materials reinforcement and water treatment." Journal of Chemical Engineering and Materials Science 5.1 (2014): 1-6. (Year: 2014).

Khalil, HPS Abdul, et al. "Oil palm shell nanofiller in seaweed-based composite film: Mechanical, physical, and morphological properties." BioResources 12.3 (2017): 5996-6010. (Year: 2017).

International Preliminary Report on Patentability and English translation of the Written Opinion of the International Searching Authority for International Application No. PCT/JP2018/038518, dated Apr. 30, 2020.

International Search Report for PCT/JP2018/038518 (PCT/ISA/210) mailed on Dec. 11, 2018.

* cited by examiner

PLANT GROWTH PROMOTER

CROSS REFERENCE TO RELATED APPLICATIONS

The present application is a divisional application of U.S. patent application Ser. No. 16/651,986, filed on Mar. 27, 2020, the entire disclosure of which is incorporated herein by reference and which is a 35 U.S.C. § 371 national stage patent application of international patent application PCT/JP2018/038518, filed on Oct. 16, 2018, the entire disclosure of which is incorporated herein by reference and which claims the benefit of the Japanese patent application JP 2017-200920, filed on Oct. 17, 2017, the entire disclosure of which is also incorporated herein by reference.

FIELD OF THE INVENTION

The present invention relates to a plant growth promoter, a method for producing a plant growth promoter, and a method for growing a plant.

BACKGROUND OF THE INVENTION

Various nutritional factors are necessary for plant growth. A shortage of some of the factors is known to hinder plant growth. For example, three major fertilizer factors are: nitrogen which is a component element of proteins; phosphorus which is not only a constituent element of nucleic acids or phospholipids but plays an important role in energy metabolism and synthesis or decomposition reactions of substances; and potassium which has physiological action of substance metabolism or Mass transfer. A shortage of these major components generally depauperates plant growth. Calcium is an important component constituting plant bodies and cells and also plays an important role in maintaining the balance of the metabolic system. Therefore, deficiency in calcium causes physiological disorders. In addition, various nutrients such as Mg, Fe, S, B, Mn, Cu, Zn, Mo, Cl, Si, and Na are necessary for plants.

These nutritional components such as nitrogen, phosphorus, and potassium are applied in the form of a base fertilizer or an additional fertilizer, or a liquid fertilizer is diluted and provided by soil drench or foliar spray. Although these fertilizers are essential for plant growth, the application of the fertilizers beyond certain concentrations cannot contribute to improvement in the growability and yields of plants.

However, an important challenge to agricultural production is to increase yields by promoting the growth of agricultural crops and increasing harvests per unit area. For this purpose, various necessary plant growth regulators have been developed and utilized. The plant growth regulators represented by gibberellin, auxin, and the like are used for regulating growth such as sprouting, rooting, elongation, flower formation, or fruit setting, and morphogenic reaction. However, these substances have multifaceted and complicated actions and limited applications.

Various techniques considered to lead to the growth promotion of agricultural crops have heretofore been proposed. In fields where agricultural crops are to be cultivated, soil properties are important factors in terms of productivity and the like, and studies are being carried out to increase productivity by improving soil properties. The use of plant-based materials at that time has also been studied.

JP-A 61-289820 describes a soil improvement agent in which a coconut shell is crushed and cut into irregular shapes with its epidermis and hard inner shell adhering to each other, and then sorted and packaged according to size.

JP-A 9-302340 describes a soil improvement agent mainly composed of the fibrous material of coconut rind.

JP-A 11-50052 describes a soil expansion and softening agent in which coconut shell chips and coconut shell fibers are mixed with coconut shell dust.

JP-A 2000-23560 describes a soil conditioner containing one or more selected from iron salts and aluminum salts.

JP-A 2000-23560 describes at least one kind of culture soil selected from the group consisting of coconut dust, beaten bark, and sawdust as the culture soil.

JP-A 2003-192484 describes a growth promoter for plants characterized by containing an organic substance such as a pulverized product obtained by pulverizing the mesocarp of coconut fruit or a fermented product thereof, and a neutralizing agent.

SUMMARY OF THE INVENTION

The present invention provides a plant growth promoter that does not cause phytotoxicity or the like in plants and exhibits an excellent growth promoting effect on plants such as agricultural crops.

The present invention relates to a plant growth promoter containing a lignocellulosic biomass, wherein the lignocellulosic biomass has a lignin content of 40% by mass or more and 60% by mass or less and a contact angle with water of 50° or less.

Further, the present invention relates to a method for producing the plant growth promoter of the present invention, the method including a step of hydrophilically treating a lignocellulosic biomass.

In addition, the present invention relates to a method for growing a plant, wherein the plant is cultivated in a soil containing the plant growth promoter of the present invention.

According to the present invention, there are provided a plant growth promoter, a production method thereof, and a method for growing a plant, which exhibit an excellent growth promoting effect on a plant such as an agricultural crop without causing phytotoxicity in the plant. Yield can be improved by applying the plant growth promoter of the present invention to, for example, an agricultural crop.

EMBODIMENTS OF THE INVENTION

<Plant Growth Promoter>

The plant growth promoter of the present invention contains a lignocellulosic biomass, wherein the lignocellulosic biomass (hereinafter also referred to as the lignocellulosic biomass of the present invention) has a lignin content of 40% by mass or more and 60% by mass or less and a contact angle with water of 50° or less.

From the viewpoint of promoting growth, the lignocellulosic biomass of the present invention has a lignin content of 40% by mass or more and preferably 45% by mass or more, and 60% by mass or less and preferably 55% by mass or less.

The lignin content in the lignocellulosic biomass of the present invention is determined by the Klason lignin method. Specifically, the total lignin content is calculated as the sum of the acid-insoluble lignin ratio and the acid-soluble lignin ratio, according to the TAPPI formula analysis method T222om-83.

Further, from the viewpoint of promoting growth, the lignocellulosic biomass of the present invention has a contact angle with water (hereinafter also referred to as a water contact angle) of 50° or less, preferably 45° or less, and more preferably 40° or less, and preferably 0° or more, more preferably 5° or more, and further preferably 10° or more.

The contact angle with water of the lignocellulosic biomass of the present invention is measured under the following conditions.

[Measurement Method of Contact Angle with Water of Lignocellulosic Biomass]

The lignocellulosic biomass to be measured is usually obtained as a solid, such as a powder. 0.1 to 0.3 g of the lignocellulosic biomass is sampled and pressure is applied so that the density is 1.3 to 1.7 g/cm$^3$ to obtain a compressed product as a sample having a flat surface, for example, a compressed product having a shape such as a cylinder, a cube, or a rectangular parallelepiped. In addition, when the particles of the lignocellulosic biomass to be measured are large or irregular in shape and the like, the particles may be pulverized to obtain a powder having adjusted particle size and shape, and this powder may be used as the sample as a compressed product in the same manner as described above. Further, the powder of the lignocellulosic biomass may be finely pulverized by compression.

The sample, for example, a compressed product of the lignocellulosic biomass, is placed so that its flat surface is horizontal. Pure water of 20° C. and with a droplet size of 5 μm is dropped onto the flat surface, and the contact angle after 1 second is measured. The contact angle is calculated by finding the angle of the straight line connecting the left and right end points and the vertex of the droplet to the solid surface and doubling this (θ/2 method). The measurement is performed 3 times per sample, and the value obtained as the average value thereof is adopted as the contact angle with water.

A raw material of the lignocellulosic biomass of the present invention is preferably selected from plant biomass. Examples of the plant biomass include herbaceous biomass and ligneous biomass. Among these, herbaceous biomass is preferable.

The term "herbaceous biomass" means plant raw materials other than trees growing on grassland, or non-ligneous plant sites. Specific examples include plant materials of Gramineae, Malvaceae, and Leguminosae, and non-ligneous materials of plants of Palmae.

Examples of the plant materials of Gramineae include bagasse such as sugarcane bagasse and sorghum bagasse, switchgrass, elephant grass, corn stover, corncob, rice straw, wheat straw, barley, Japanese pampas grass, grass, Johnson grass, Erianthus, and napier grass. Examples of the plant materials of Malvaceae include kenaf and cotton plant. Examples of the plant materials of Leguminosae include alfalfa. Examples of the non-ligneous materials of Palmae include palm kernel shells and palm empty fruit bunches.

The raw material of the lignocellulosic biomass of the present invention can be selected from seed shells of plant seeds, such as peach seed shells, prune seed shells, Japanese apricot seed shells, Japanese plum seed shells, peanut seed shells, and walnut seed shells, which are plant biomass. The palm kernel shell mentioned above is also a seed shell of a plant seed.

Examples of the ligneous biomass include various woods such as wood chips obtained from conifer such as Japanese larch and bald cypress, and broadleaf trees such as oil palm and Japanese cypress; and wood pulp produced from these woods.

These plant biomass may be used singly or in combination of two or more.

Of these plant biomasses, lignocellulosic biomass is preferably used as the raw material. Lignocellulosic biomass includes cellulose, hemicellulose, and lignin as main components. Among lignocellulosic biomasses, those having a lignin content of 40% by mass or more and 60% by mass or less and a contact angle with water of 50° or less can be used as is as the lignocellulosic biomass of the present invention.

The lignocellulosic biomass of the present invention is preferably a biomass from Palmae plants. Further, as the lignocellulosic biomass of the present invention, a lignocellulosic biomass selected from palm kernel shells and coconut coir dust is preferable. These usually have a lignin content of 40% by mass or more and 60% by mass or less in an untreated state obtained as a natural product.

In addition, the lignocellulosic biomass of the present invention may be a product obtained by subjecting the plant biomass to a treatment such as hydrophilization. Specifically, a hydrophilized lignocellulosic biomass obtained by hydrophilically treating a lignocellulosic biomass so that the lignin content is 40% by mass or more and 60% by mass or less and the contact angle with water is 50° or less can be used as the lignocellulosic biomass of the present invention. The lignocellulosic biomass of the present invention is preferably such a hydrophilized lignocellulosic biomass. The hydrophilized lignocellulosic biomass can be obtained by, as described later, treating with alkali, acid, hot water or the like. By carrying out such a treatment, the lignocellulosic biomass has an increased surface area and better affinity with soil, and as a result it is thought that a more desirable environment for plant growth, such as agglomeration and softening of the soil, is achieved. Therefore, hydrophilized lignocellulosic biomass is more preferable in terms of obtaining the effects of the present invention.

The lignocellulosic biomass of the present invention is preferably in the form of particles. The particles may be in any form that can be easily formed from natural biomass, such as a powder and pellets.

The lignocellulosic biomass of the present invention has an average particle size of preferably 1,000 μm or less, more preferably 500 μm or less, further preferably 300 μm or less, and furthermore preferably 150 μm or less, and preferably 0.1 μm or more, more preferably 1.0 μm or more, and furthermore preferably 10 μm or more. The average particle size of the lignocellulosic biomass of the present invention is measured using a laser diffraction/scattering particle size distribution analyzer "LA-950" (manufactured by Horiba, Ltd.).

The plant growth promoter of the present invention has a water contact angle of preferably 50° or less, more preferably 45° or less, and further preferably 40° or less, and preferably 0° or more, more preferably 5° or more, and further preferably 10° or more. The water contact angle of the plant growth promoter is measured in the same manner as the method for measuring the water contact angle of lignocellulosic biomass described above, except that the lignocellulosic biomass is replaced with the plant growth promoter.

The plant growth promoter of the present invention is preferably in the form of particles. The particles may be in any form that can be easily formed from a component including a natural biomass, such as a powder and pellets.

The plant growth promoter of the present invention has an average particle size of preferably 1,000 μm or less, more preferably 500 μm or less, further preferably 300 μm or less, and furthermore preferably 150 μm or less, and preferably 0.1 μm or more, more preferably 1.0 μm or more, and furthermore preferably 10 μm or more. The average particle size of the plant growth promoter of the present invention is measured using a laser diffraction/scattering particle size distribution analyzer "LA-950" (manufactured by Horiba, Ltd.).

The plant growth promoter of the present invention preferably contains 10% by mass or more and more preferably 20% by mass or more, and preferably 100% by mass or less, of the lignocellulosic biomass of the present invention. The plant growth promoter of the present invention may be composed of the lignocellulosic biomass of the present invention. Further, the plant growth promoter of the present invention can contain components other than the lignocellulosic biomass of the present invention.

The plant growth promoter can contain, as optional components, for example:

(1) a fertilizer component;
(2) a mineral powder, a clay component, or other soil-improving component such as zeolite, vermiculite, bentonite, soft silica (silicate terra alba), perlite, peat moss, or bark compost;
(3) a polymer substance such as polyethyleneimine, polyvinyl alcohol, or polyacrylic acid;
(4) a signal molecule such as chitooligosaccharide, a chitinous compound, or flavonoid such as isoflavone or rutin;
(5) a fungus such as an arbuscular mycorrhizal fungus;
(6) a bacterium such as *Bacillus* sp., *Pseudomonas* sp., *Azospirillum* sp., *Paenibacillus* sp., *Burkholderia* sp., *Serratia* sp., *Enterobacter* sp., *Brevibacterium* sp., *Curtobacterium* sp., or a legume symbiotic root nodule bacterium; and
(7) soyasaponin.

Among the above components, examples of the arbuscular mycorrhizal fungus of (5) include fungi belonging to the *Gigaspora* sp. and the *Glomus* sp. Among these, examples of *Glomus* sp. include *Glomus intraradices*.

Among the above components, examples of the *Bacillus* sp. of (6) include *Bacillus amyloliquefaciens, Bacillus licheniformis, Bacillus subtilis*, and *Bacillus thuringiensis*. Examples of *Pseudomonas* sp. include *Pseudomonas putida*, and *Pseudomonas fluorescens*. Examples of *Azospirillum* sp. include *Azospirillum brasilense, Azospirillum lipoferum, Azospirillum halopraeferans*, and *Azospirillum amazonense*. Examples of *Paenibacillus* sp. include *Paenibacillus polymyxa* and *Paenibacillus macerans*. Examples of *Burkholderia* sp. include *Burkholderia gladioli*. Examples of *Serratia* sp. include *Serratia marcescens*. Examples of *Enterobacter* sp. include *Enterobacter cloacae*. Examples of *Brevibacterium* sp. include *Brevibacterium iodinum* and *Brevibacterium brevis*. Examples of *Curtobacterium* sp. include *Curtobacterium flaccumfaciens*. Examples of the legume symbiotic root nodule bacterium include bacteria belonging to the *Rhizobium* genus, the *Bradyrhizobium* genus, and *Azorhizobium* genus. Examples of *Bradyrhizobium* sp. include *Bradyrhizobium diazoefficiens, Bradyrhizobium japonicum, Bradyrhizobium elkanii*, and *Ensifer fredii*.

Among the above components, examples of (7) soyasaponin include the examples described in paragraph of WO-A 2018/159393.

The plant growth promoter of the present invention can contain 1% by mass or more and 50% by mass or less of (1) a fertilizer component.

The plant growth promoter of the present invention can contain 1% by mass or more and 50% by mass or less of (2) a mineral powder, a clay component, or other soil-improving component; or (3) a polymer substance, respectively.

The plant growth promoter of the present invention can contain $2.5 \times 10^{-13}$% by mass or more and $2.5 \times 10^{-11}$% by mass or less of (4) a signal molecule.

The plant growth promoter of the present invention can contain $10^2$ cfu (colony forming units) or more and $10^7$ cfu or less of (5) a fungus and/or (6) a bacterium per 1 g of the total of the lignocellulosic biomass of the present invention, respectively. Here, in the case of a fungus, the colony forming unit means the number of spores.

The plant growth promoter of the present invention can contain (7) soyasaponin so as to be used in the amount described in paragraph [0040] of WO-A 2018/159393, for example.

It is expected that the activity and the amount of adhesion of useful microorganisms, for example, plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; and legume symbiotic root nodule bacteria, that exist in the soil will be able to be improved by adding plant growth promoter of the present invention to soil. It is expected similarly that the activity and the amount of adhesion of plant growth-promoting bacteria such as an arbuscular mycorrhizal fungus, *Bacillus* sp., *Pseudomonas* sp., *Azospirillum* sp., *Paenibacillus* sp., *Burkholderia* sp., *Serratia* sp., *Enterobacter* sp., *Brevibacterium* sp., and *Curtobacterium* sp.; or legume symbiotic root nodule bacteria that the plant growth promoter of the present invention contains will be able to be improved.

From the viewpoint of attachment of the lignocellulosic biomass of the present invention to the action site and the viewpoint of an increase in the permeation amount, the plant growth promoter of the present invention can contain a surfactant. Examples of the surfactant include one or more surfactants selected from nonionic surfactants, anionic surfactants, cationic surfactants, and amphoteric surfactants. As the surfactant, a nonionic surfactant is preferable.

When the plant growth promoter of the present invention contains a surfactant, the content of the surfactant is, with respect to 100 parts by mass of the lignocellulosic biomass of the present invention, preferably 0.01 parts by mass or more, more preferably 0.1 parts by mass or more, and further preferably 1 part by mass or more, and preferably 100 parts by mass or less, more preferably 80 parts by mass or less, and further preferably 50 parts by mass or less.

From the viewpoint of increasing the amount of the lignocellulosic biomass of the present invention attached to the action site, the plant growth promoter of the present invention can contain a water-soluble polymer. Herein, the term "water soluble" in regard to the water-soluble polymer refers to dissolving 1 g or more in 100 g of water at 20° C. Any of natural, semisynthetic, and synthetic polymers can be used as the water-soluble polymer. Among them, a water-soluble polysaccharide polymer is preferable. Specific examples of the water-soluble polysaccharide polymer include guar gum, xanthan gum, starch, cellulose, tara gum, locust bean gum, carrageenan, and their derivatives. When the plant growth promoter of the present invention contains a water-soluble polymer, the water-soluble polymer is contained in an amount of preferably 1 part by mass or more, more preferably 10 parts by mass or more, and further preferably 50 parts by mass or more, and preferably 1,900 parts by mass or less, more preferably 600 parts by mass or less, and further preferably 300 parts by mass or less, with respect to 100 parts by mass of the lignocellulosic biomass of the present invention.

The plant growth promoter of the present invention can contain, for example, a fertilizer component in addition to these. Specifically, a fertilizer component available under a trade name such as HYPONICA (Kyowa Co., Ltd.) or HYPONEX can be contained in an amount of 1 part by mass or more and 1,900 parts by mass or less with respect to 100 parts by mass of the lignocellulosic biomass of the present invention.

The plant growth promoter of the present invention is usually in the form of particles including the lignocellulosic biomass of the present invention, but may be in the form of a molded product of the lignocellulosic biomass of the present invention, a complex product of the lignocellulosic biomass of the present invention and another product, and the like.

The plant growth promoter of the present invention is preferably used by adding it to soil. Specifically, the plant growth promoter of the present invention is preferably a soil addition type plant growth promoter. Application of the plant growth promoter of the present invention to a plant, for example, an agricultural crop, can be carried out in soil containing the plant growth promoter of the present invention to cultivate the plant, for example, the agricultural crop.

The plant to which the present invention can be applied is preferably a plant used as an agricultural crop. The plant growth promoter of the present invention can be used as a plant yield enhancer, and further as a crop yield enhancer. Examples of the plants to which the plant growth promoter of the present invention can be applied include Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae. Specifically, examples of fruit and vegetables include cucumbers, pumpkins, watermelons, melons, tomatoes, eggplants, bell peppers, strawberries, okra, green beans, broad beans, peas, green soybeans, and corn. Examples of leaf vegetables include Chinese cabbages, pickled greens, Ching Guang Juai, cabbages, cauliflowers, broccolis, brussels sprouts, onions, welsh onions, garlics, rakkyos, Chinese chives, asparaguses, lettuces, butter lettuces, celeries, spinaches, garland chrysanthemums, parsleys, mitsubas, cicelies, udo salad plants, myoga gingers, sweet coltsfoot, and Japanese basils. Examples of root vegetables include daikon radishes, turnips, burdocks, carrots, potatoes, eddoes, sweet potatoes, yams, gingers, and lotuses. In addition, the plant growth promoter of the present invention may be used for rice, wheat varieties, flowers, and the like, and is more preferably applied to cereals such as beans such as soybeans and green soybeans, which tend to be cultivated on a large scale.

<Method for Producing Plant Growth Promoter>

The present invention provides a method for producing the plant growth promoter of the present invention, the method including a step of hydrophilically treating a lignocellulosic biomass. Preferred embodiments of the plant biomass of the raw material to be used in the method for producing a plant growth promoter of the present invention are the same as those of the plant growth promoter of the present invention. In addition, the matters described in relation to the plant growth promoter of the present invention can be appropriately applied to the method for producing a plant growth promoter of the present invention.

In the method for producing a plant growth promoter of the present invention, the lignin content of the lignocellulosic biomass (hereinafter also referred to as a raw material lignocellulosic biomass) before hydrophilic treatment is preferably 40% by mass or more and 60% by mass or less. For the raw material, it is preferable to use the lignin of a lignocellulosic biomass having such a lignin content, and perform a hydrophilic treatment under conditions in which the lignin content does not greatly vary.

Further, the water contact angle of the raw material lignocellulosic biomass may be 50° or less.

The hydrophilic treatment is preferably an alkali treatment, a hot water treatment, an acid treatment, or a combination of these, more preferably an alkali treatment, a hot water treatment, or a combination of these, and further preferably a combination of an alkali treatment and a hot water treatment (hereinafter also referred to as "alkali hot water treatment"). The hydrophilic treatment may include a neutralization treatment, a drying treatment, and the like as necessary.

The hydrophilic treatment is preferably performed in a medium including water.

It is preferable to obtain a lignocellulosic biomass having a contact angle with water of 50° or less by the hydrophilically treating step.

It is preferable that the lignocellulosic biomass after the hydrophilically treating step has a lignin content of 40% by mass or more and 60% by mass or less and has a contact angle with water of 50° or less.

The alkali treatment is now described.

The alkali treatment is carried out by contacting the alkaline medium with the raw material lignocellulosic biomass at a predetermined temperature for a predetermined time. The alkaline medium preferably includes water. Specific examples include an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. The pH of the alkaline medium is preferably 10 or more and 14 or less. The temperature of the alkaline medium is preferably 25° C. or higher and 50° C. or lower. The contact time of the alkaline medium is preferably 0.1 hour or more and 7 days or less.

The following method is an example of the alkali treatment.

A slurry is produced by mixing 100 parts by mass of the raw material lignocellulosic biomass and 200 parts by mass or more and 2,000 parts by mass or less of an alkaline medium having an arbitrary concentration, preferably an alkaline medium selected from an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. The alkali treatment is carried out by leaving the slurry to stand or with stirring at 25° C. or higher and 50° C. or lower, for example, at room temperature, for 1 hour or more and 1 week or less.

It is preferable to perform neutralization after the alkali treatment. The neutralization is performed by adding a neutralizing agent, for example, hydrochloric acid or sulfuric acid having an arbitrary concentration, so that the post-treatment pH of the slurry including the lignocellulosic biomass is near neutral, for example, a pH of 5.5 or more and further 6.0 or more, and 8.0 or less and further 7.0 or less. Drying can also be performed after the alkali treatment, and preferably after neutralization.

The hot water treatment is now described.

The hot water treatment is carried out by contacting hot water with lignocellulosic biomass (A) for a certain period of time. The temperature of the hot water is preferably 80° C. or higher and 200° C. or lower. The contact time of hot water is preferably 0.1 hours or more and 24 hours or less.

The following method is an example of the hot water treatment.

A slurry is produced by mixing 100 parts by mass of the raw material lignocellulosic biomass and 200 parts by mass or more and 2,000 parts by mass or less of hot water, for example, heated ion exchange water. For example, the treatment temperature can be selected from 120° C. to 200° C., and the treatment time can be selected from 1 hour to 24 hours. The hot water treatment is carried out by leaving the slurry to stand or with stirring under such conditions. Drying can also be performed after the hot water treatment.

The acid treatment is now described.

The acid treatment is carried out by contacting an acidic medium with the raw material lignocellulosic biomass at a predetermined temperature for a predetermined time. The acidic medium preferably includes water. Specific examples include aqueous solutions of hydrochloric acid, sulfuric acid, nitric acid, phosphoric acid, acetic acid, peracetic acid, sulfurous acid, nitrous acid, oxalic acid, carbonic acid, boric acid, hypochlorous acid, and the like. The pH of the acidic medium is preferably 1 or more and 5 or less. The temperature of the acidic medium is preferably 25° C. or higher and 200° C. or lower. The contact time of the acidic medium is preferably 0.1 hours or more and 7 days or less.

The following method is an example of the acid treatment.

A slurry is produced by mixing 100 parts by mass of the raw material lignocellulosic biomass and 200 parts by mass or more and parts by mass or less of an acidic medium having an arbitrary concentration, preferably an acidic medium selected from an acidic medium including water and an acid selected from hydrochloric acid, sulfuric acid, nitric acid, phosphoric acid, acetic acid, peracetic acid, sulfurous acid, nitrous acid, oxalic acid, carbonic acid, boric acid, and hypochlorous acid. For example, the treatment temperature can be selected from 80° C. to 200° C., and the treatment time can be selected from 1 hour to 24 hours. The acid treatment is carried out by leaving the slurry to stand or with stirring under such conditions.

It is preferable to perform neutralization after the acid treatment. The neutralization is carried out by adding a neutralizing agent, for example, an aqueous sodium hydroxide solution having an arbitrary concentration, so that the post-treatment pH of the slurry including the lignocellulosic biomass is near neutral, for example, a pH of 5.5 or more and further 6.0 or more, and 8.0 or less and further 7.0 or less. Drying can also be performed after the acid treatment, and preferably after the neutralization.

The alkali hot water treatment is now described.

The alkali hot water treatment is carried out by performing the above alkali treatment in a high-temperature alkaline medium including water. Specific examples of the alkaline medium are the same as those in the alkali treatment. The pH of the alkaline medium used in the alkali hot water treatment is preferably 9.0 or higher and more preferably 10.0 or higher, and preferably 14.0 or lower and more preferably 13.5 or lower. The temperature of the alkaline medium used in the alkali hot water treatment is preferably 25° C. or higher and more preferably 50° C. or higher, and preferably 180° C. or lower and more preferably 150° C. or lower. The contact time of the alkaline medium used in the alkali hot water treatment is preferably 0.5 hours or longer and more preferably 0.8 hours or longer, and preferably 24 hours or shorter and more preferably 12 hours or shorter.

The following method is an example of the alkali hot water treatment.

A slurry is produced by mixing 100 parts by mass of the raw material lignocellulosic biomass and 200 parts by mass or more and 2,000 parts by mass or less of an alkaline medium having an arbitrary concentration, preferably an alkaline medium selected from an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia, and an aqueous tetramethylammonium hydroxide solution. For example, the treatment temperature can be selected from 25° C. to 180° C., and the treatment time can be selected from 0.5 hours to 24 hours. The alkali hot water treatment is carried out by leaving the slurry to stand or with stirring under such conditions.

After the alkali hot water treatment, it is preferable to perform the same kind of neutralization as in the alkali treatment. Drying can also be performed after the alkali hot water treatment, and preferably after the neutralization.

In the present invention, in the case of performing the hydrophilic treatment in a medium including water, it is preferable to perform drying of the treated product after the hydrophilic treatment, preferably after neutralization. Drying can be performed, for example, at 50° C. or higher and 100° C. or lower. Specifically, the drying can be performed in a vacuum dryer at a predetermined temperature, for example, 50° C., until the water content is 5 parts by mass or less.

The obtained lignocellulosic biomass having a lignin content of 40% by mass or more and 60% by mass or less and a contact angle with water of 50° or less can be used as the plant growth promoter of the present invention as it is or by processing into an appropriate shape and size.

It is preferable that the lignocellulosic biomass obtained by the hydrophilic treatment also has a water contact angle of 50° or less, further 45° or less, and further 40° or less, and 0° or more, further 5° or more, and further 10° or more.

An example of the production method of the present invention is now described.

The raw material lignocellulosic biomass and water are placed in a treatment vessel, and the solid content is set to preferably 5% by mass or more and 50% by mass or less. The raw material lignocellulosic biomass may be pulverized in advance to have an average particle size of preferably 0.1 μm or more and 1,000 μm or less. As the water, it is preferable to use an aqueous alkali solution containing an alkali agent such as sodium hydroxide. The pH of the mixture is preferably in the above range. The contents are preferably treated at 25° C. or higher and 150° C. or lower for preferably 0.5 hours or more and 24 hours or less to obtain a liquid mixture including the lignocellulosic biomass of the present invention. An autoclave can be used for the treatment. The pH of the mixture is adjusted with an acid agent to near neutral, preferably 5.5 or more and 8.0 or less, and then dried preferably at 40° C. or higher and 120° C. or lower to obtain in a solid state the lignocellulosic biomass of the present invention that will serve as the plant growth promoter of the present invention.

<Method for Growing a Plant>

The present invention provides a method for growing a plant, wherein the plant is cultivated in a soil containing the plant growth promoter of the present invention. Specifically, there is provided a method for growing a plant, wherein the plant is cultivated in a soil containing the lignocellulosic biomass of the present invention. The preferred embodiments of the lignocellulosic biomass of the present invention used in the method for growing a plant of the present invention are the same as those of the plant growth promoter of the present invention. Plants to which the method for growing a plant of the present invention can be applied are the same as those of the plant growth promoter of the present invention. Further, it is preferable that the method for growing a plant of the present invention is a method for growing an agricultural crop or a method for cultivating an agricultural crop.

In the method for growing a plant of the present invention, the application time and the number of applications of the plant growth promoter of the present invention are not particularly limited. The plant growth promoter of the present invention may also be applied by adding to the soil and the like before sowing. The plant growth promoter of the present invention may be appropriately applied in accordance with the level of plant growth in any period from the start of cultivation, such as sowing and planting, to the end of cultivation, such as harvesting.

Further, in the method for growing a plant of the present invention, the plant growth promoter of the present invention is applied to the plant by adding it to the soil in which the plant is to be cultivated. The timing for adding to the soil is preferably before sowing.

In the present invention, the addition of the plant growth promoter of the present invention to the soil can be carried out by mixing the plant growth promoter of the present invention into the soil, spraying the plant growth promoter of the present invention onto the soil, and the like.

Examples of the specific method of adding the lignocellulosic biomass of the present invention to the soil in a field include a method of plowing while spraying the lignocellulosic biomass of the present invention by using a spreading machine in combination with a cultivator.

In the present invention, the plant growth promoter of the present invention, further, the lignocellulosic biomass of the present invention, is added in an amount of preferably 0.0001 parts by mass or more, more preferably 0.005 parts by mass or more, and further preferably 0.01 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less per 100 parts by mass of the soil for cultivating the plant. In other words, in the present invention, the plant is cultivated in a soil containing the plant growth promoter of the present invention, further, the lignocellulosic biomass of the present invention, in an amount of preferably 0.0001 parts by mass or more, more preferably 0.01 parts by mass or more, and further preferably 0.05 parts by mass or more, and preferably 10 parts by mass or less, more preferably 5 parts by mass or less, further preferably 2.5 parts by mass or less, furthermore preferably 2.0 parts by mass or less, furthermore preferably 1.0 parts by mass or less, and furthermore preferably 0.5 parts by mass or less.

When the plant growth promoter of the present invention is added using the plant growth method of the present invention to the soil by, for example, spraying, the plant growth promoter of the present invention, further, the lignocellulosic biomass of the present invention, is added in an amount of preferably 0.2 kg or more, more preferably 2 kg or more, and further preferably 20 kg or more, and preferably 20,000 kg or less, more preferably 5,000 kg or less, further preferably 2,000 kg or less, furthermore preferably 1,000 kg or less, and furthermore preferably 500 kg or less per 10a of soil. Even when spraying the plant growth promoter of the present invention, the amount added per 100 parts by mass of soil may be within the above range.

<Other Modes of Present Invention>

The present invention relates to a soil aggregating agent containing a lignocellulosic biomass, wherein the lignocellulosic biomass has a lignin content of 40% by mass or more and 60% by mass or less and a contact angle with water of 50° or less.

Further, the present invention relates to a soil aggregating method including mixing a soil aggregating agent containing a lignocellulosic biomass with soil, wherein the lignocellulosic biomass has a lignin content of 40% by mass or more and 60% by mass or less and a contact angle with water of 50° or less.

In addition, the present invention relates to a method for producing a soil granulated material, the method including mixing a soil aggregating agent containing a lignocellulosic biomass with soil, wherein the lignocellulosic biomass has a lignin content of 40% by mass or more and 60% by mass or less and a contact angle with water of 50° or less.

In the soil aggregating agent, the soil aggregating method, and the method for producing a soil granulated material of the present invention, specific examples and preferred embodiments of the lignocellulosic biomass are the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to the soil aggregating agent, the soil aggregating method, and the method for producing a soil granulated material of the present invention.

The present invention relates to a use, as a plant growth promoter, of a lignocellulosic biomass having a lignin content of 40% by mass or more and 60% by mass or less and a contact angle with water of 50° or less.

Further, the present invention relates to a use, for promoting plant growth, of a lignocellulosic biomass having a lignin content of 40% by mass or more and 60% by mass or less and a contact angle with water of 50° or less.

In addition, the present invention relates to a use, as a soil aggregating agent, of a lignocellulosic biomass having a lignin content of 40% by mass or more and 60% by mass or less and a contact angle with water of 50° or less.

Furthermore, the present invention relates to a use, for aggregating soil, of a lignocellulosic biomass having a lignin content of 40% by mass or more and 60% by mass or less and a contact angle with water of 50° or less.

In these uses of the present invention, specific examples and preferred embodiments of the lignocellulosic biomass having a lignin content of 40% by mass or more and 60% by mass or less and a contact angle with water of 50° or less are each the same as those of the plant growth promoter, the method for producing a plant growth promoter, and the method for growing a plant of the present invention. Further, the matters described for the plant growth promoter, the method for producing a plant growth promoter, and the method for growing a plant of the present invention can be applied to these uses of the present invention.

EXAMPLES

The plant growth promoter of the inventive product was produced as follows.

Production Example 1

Palm kernel shell (PKS) (palm kernel shell, Shodensya Co., Ltd.) that had been passed through a 1 mm diameter mold sieve in an amount of 30 g as a dry mass was placed in a glass bottle, and 0.8% by mass aqueous sodium hydroxide solution was added thereto so that the solid content was 40% by mass. The glass bottle was heated in an autoclave at 100° C. for 1 hour to obtain a reaction product. The resulting slurry was neutralized with 1 M aqueous sulfuric acid until a pH of 7, and then heat dried at 80° C. to obtain inventive product 1 of the plant growth promoter. In this example, the added amount of the 0.8% by mass aqueous sodium hydroxide solution was 150 parts by mass and the added amount of NaOH was 1.2 parts by mass with respect to 100 parts by mass of PKS as the raw material biomass.

Production Example 2

Inventive product 2 of the plant growth promoter was produced in the same manner as in Production Example 1, except that the raw material biomass was changed to coconut coir dust.

Production Example 3

Inventive product 3 of the plant growth promoter was produced by performing the same treatment as in Production Example 1, except that a 1.6% by mass aqueous sodium hydroxide solution was added so that the solid content of PKS as raw material biomass was 20% by mass.

Production Example 4

Palm kernel shell (PKS) (palm kernel shell, Shodensya Co., Ltd.) (water content 2.3%, lignin content 48.8% by mass) was placed into a mini-speed mill "MS-05" (manufactured by Labonect Co., Ltd.) and pulverized 5 times for 20 seconds. The obtained pulverized material was sieved, passed through a 500 μm diameter mold sieve, and the material that remained on the 355 μm diameter mold sieve was taken as inventive product 4 of the plant growth promoter.

Production Examples 5, 6, 7

Inventive products 5, 6, and 7 of the plant growth promoter were produced in the same manner as in Production Example 4, except that the raw material biomass was changed to peach seed shell, prune seed shell, or Japanese plum seed shell.

Production Examples 8 to 10

Inventive products 8 to 10 of the plant growth promoter were produced in the same manner as in Production Example 3, except that the raw material biomass was changed to Japanese apricot seed shell, peanut seed shell, or walnut seed shell.

As comparative plant growth promoter 1, calcium lignin sulfonate (Ligno Super D, manufactured by Kono New Material Development Co., Ltd.) was used as is.

Further, comparative plant growth promoters 2 and 3 were produced in the same manner as in Production Example 3, except that the type of raw material biomass and the treatment conditions were as shown in Table 1.

In addition, as comparative plant growth promoter 4, the coir dust of Production Example 2 was used as is.

Table 1 shows the lignin content in each raw material biomass, the treatment conditions, and the like for the inventive products and the comparative products of the plant growth promoter used in the following examples and comparative examples. The lignin content was determined by the Klason lignin method. Specifically, the total lignin content is calculated as the sum of the acid-insoluble lignin ratio and the acid-soluble lignin ratio, according to the TAPPI formula analysis method T222om-83.

Note that, in the conditions of the production examples and the comparative production examples, the lignin content in the raw material biomass hardly varies after the treatment, and therefore, for convenience, the lignin content in the raw material biomass is taken as the lignin content of a biomass after the treatment, that is, the lignin content in the biomass used as the plant growth promoter.

TABLE 1

| | plant growth promoter | | | | | | | |
|---|---|---|---|---|---|---|---|---|
| | raw material biomass | | | treatment conditions | | | | |
| symbol | type | lignin content (% by mass) | pre-treatment contact angle with water (°) | amount of aqueous NaOH solution added (parts by mass) | amount of NaOH added (parts by mass) | temperature (° C.) | treatment time (h) | post-treatment water contact angle (°) |
| comparative product 1 | calcium lignin sulfonate (no treatment) | 82.9 | 0.0 | — | — | — | — | — |
| comparative product 2 | bagasse | 23.8 | 99.8 | 400 | 6.4 | 100 | 1 | 55.7 |
| comparative product 3 | Japanese white birch | 35.9 | 76.6 | 400 | 6.4 | 100 | 1 | 66.7 |
| comparative product 4 | coconut coir dust (no treatment) | 50.4 | 63.5 | — | — | — | — | — |
| inventive product 1 | PKS | 48.8 | 24.4 | 150 | 1.2 | 100 | 1 | 20.5 |

TABLE 1-continued plant growth promoter

| | raw material biomass | | | treatment conditions | | | | |
|---|---|---|---|---|---|---|---|---|
| symbol | type | lignin content (% by mass) | pre-treatment contact angle with water (°) | amount of aqueous NaOH solution added (parts by mass) | amount of NaOH added (parts by mass) | temperature (° C.) | treatment time (h) | post-treatment water contact angle (°) |
| inventive product 2 | coconut coir dust | 50.4 | 63.5 | 150 | 1.2 | 100 | 1 | 43.8 |
| inventive product 3 | PKS | 48.8 | 24.4 | 400 | 6.4 | 100 | 1 | 17.3 |
| inventive product 4 | PKS | 48.8 | 24.4 | — | — | — | — | — |
| inventive product 5 | peach seed shell | 45.8 | 34.5 | — | — | — | — | — |
| inventive product 6 | prune seed shell | 45.4 | 29.4 | — | — | — | — | — |
| inventive product 7 | Japanese plum seed shell | 40.5 | 29.7 | — | — | — | — | — |
| inventive product 8 | Japanese apricot seed shell | 42.2 | 56.3 | 400 | 6.4 | 100 | 1 | 26.3 |
| inventive product 9 | peanut seed shell | 42.0 | 77.3 | 400 | 6.4 | 100 | 1 | 29.7 |
| inventive product 10 | walnut seed shell | 43.3 | 50.4 | 400 | 6.4 | 100 | 1 | 32.7 |

In the table, the amount of the aqueous NaOH solution added and the amount of NaOH added in the treatment conditions are each represented as parts by mass with respect to 100 parts by mass of the raw material biomass.

<Evaluation>

(1) Water Resistance Evaluation of Soil Granulated Material

The water resistance of a mixed granulated material obtained by mixing a plant growth promoter and soil was evaluated.

As the soil, a sample of soil (alluvial soil) from Saga Prefecture that had been passed through a sieve having 2 mm openings to remove coarse particles, stones, and gravel was used.

The soil was placed in a 100 mL polycup, and the plant growth promoter was added so as to have the amount added shown in Table 2 with respect to 100 parts by mass of the soil. Further, water was added so as to be 30% by mass with respect to the soil, and after manually stirring for about 3 minutes, soil granulated material having a diameter of 1 to 3 mm was taken as a sample from the material obtained. The obtained soil granulated sample was placed in a disposable glass test tube (13 mm×100 mm, manufactured by IWAKI) filled with water to a height of 5 cm, and the time until the soil granulated material broke down was measured. Each test was repeated 5 times, and the average value is shown in Table 2. In addition, the amount of the plant growth promoter added in the table is represented as parts by mass with respect to 100 parts by mass of soil (the same applies hereinafter).

(2) Soybean Growth Test

The growth promotion effect on soybeans when the plant growth promoters were added to the soil and applied to soybeans was evaluated.

As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63L, "SS100-63" (Shinsei Co., Ltd.)), and a plant growth promoter was added so as to be 0.1 parts by mass with respect to 100 parts by mass of soil. Further, water was added so as to be 20 mass % with respect to the soil, and after stirring for about 5 minutes, the obtained mixture was taken as the soil sample. The soil sample was placed in a polyethylene pot for seedlings (diameter 12 cm), fertilized so that N/P/K=6 kg/6 kg/6 kg per 10 a, and soybeans grown separately until the cotyledon development stage (varieties: Fukuyutaka, IWAKURA SEED Co.) were replanted in the pot. About 3 weeks after the replanting, the soybean seedlings were taken out and washed with water, and the dry mass of the part below the ground was measured. The number of repetitions was 8, and the average value thereof was obtained. Each average value is shown in Table 3 as a relative value based on a control value of 100. The control was performed without using the plant growth promoter (Comparative Example 2-1 in Table 3). A large relative value in Table 3 means that viability until harvest is good, and an increase in crop yield is expected.

(3) Measurement of Soil Hardness

As the soil, Arakida soil (purchased from Kohnan Shoji Co., Ltd.) that had been passed through a sieve having 2 mm openings to remove coarse particles, stones, and gravel was used.

The soil was placed in an electric mixer (drum capacity 63L, "SS100-63" (Shinsei Co., Ltd.)), and a plant growth promoter was added so as to be 0.1 parts by mass with respect to 100 parts by mass of soil. Further, water was added so as to be 20 mass % with respect to the soil, and after stirring for about 5 minutes, the obtained mixture was taken as the soil sample.

A soil sample (900 g) was placed in a polyethylene pot for seedlings (diameter 12 cm). The pot was left outdoors, and 500 L/a of water was sprayed using natural water and a garden master sprayer (manufactured by KOSHIN) every two days. After 3 weeks, the hardness of the soil sample was measured. The hardness of the soil sample was measured using a Yamanaka-type soil hardness tester (Fujiwara Scientific Co., Ltd: standard soil hardness tester No. 351).

In accordance with the instruction manual of the soil hardness tester, the tip cone of the soil hardness tester was inserted until the surface of the soil sample contacted the brim, and then slowly pulled out. The reading of the scale (mm) at that time was read and calculated as a load bearing strength (kg/cm$^2$) by the following formula. Table 3 shows the average value of 5 repetitions with the load bearing strength as soil hardness.

$$P = [100X]/[0.7952(40-X)^2]$$

P: Load bearing strength (kg/cm$^2$)

X: Reading (mm)

TABLE 2

| | | symbol | plant growth promoter | | | soil granulated material water resistance (second) |
| --- | --- | --- | --- | --- | --- | --- |
| | | | lignin content (% by mass) | contact angle with water (°) | amount added with respect to soil (parts by mass) | |
| Comparative Examples | 1-1 | none | — | — | — | 27 |
| | 1-2 | comparative product 1 | 82.9 | 0.0 | 0.1 | 11 |
| | 1-3 | comparative product 2 | 23.8 | 55.7 | 0.1 | 36 |
| | 1-4 | comparative product 3 | 35.9 | 66.7 | 0.1 | 32 |
| | 1-5 | comparative product 4 | 50.4 | 63.5 | 0.1 | 71 |
| Examples | 1-1 | inventive product 1 | 48.8 | 20.5 | 0.1 | 168 |
| | 1-2 | inventive product 2 | 50.4 | 43.8 | 0.1 | 100 |
| | 1-3 | inventive product 3 | 48.8 | 17.3 | 0.1 | 288 |
| | 1-4 | inventive product 1 | 48.8 | 20.5 | 0.075 | 186 |
| | 1-5 | inventive product 1 | 48.8 | 20.5 | 0.05 | 114 |
| | 1-6 | inventive product 4 | 48.8 | 24.4 | 0.1 | 168 |
| | 1-7 | inventive product 5 | 45.8 | 34.5 | 0.1 | 104 |
| | 1-8 | inventive product 6 | 45.4 | 29.4 | 0.1 | 133 |
| | 1-9 | inventive product 7 | 40.5 | 29.7 | 0.1 | 116 |
| | 1-10 | inventive product 8 | 42.2 | 26.3 | 0.1 | 132 |
| | 1-11 | inventive product 9 | 42.0 | 29.7 | 0.1 | 112 |
| | 1-12 | inventive product 10 | 43.3 | 32.7 | 0.1 | 117 |

TABLE 3

| | | symbol | plant growth promoter | | | mass of soybean below ground (relative value) | soil hardness (kg/cm$^2$) |
| --- | --- | --- | --- | --- | --- | --- | --- |
| | | | lignin content (% by mass) | contact angle with water (°) | amount added with respect to soil (parts by mass) | | |
| Comparative Examples | 2-1 | none | — | — | — | 100 | 1.25 |
| | 2-2 | comparative product 1 | 82.9 | 27.9 | 0.1 | 105 | 0.73 |
| | 2-3 | comparative product 2 | 23.8 | 99.8 | 0.1 | 99 | 0.72 |
| Examples | 2-1 | inventive product 1 | 48.8 | 20.5 | 0.1 | 112 | 0.40 |

The invention claimed is:

1. A method for growing a plant, the method comprising:
subjecting a raw material lignocellulosic biomass to an alkali hot water treatment by contacting the raw material lignocellulosic biomass with an alkaline medium having a pH of 10.0 or more and 14.0 or less selected from the group consisting of an aqueous sodium hydroxide solution, an aqueous potassium hydroxide solution, an aqueous lithium hydroxide solution, an aqueous calcium hydroxide solution, an aqueous magnesium hydroxide solution, an aqueous sodium carbonate solution, an aqueous potassium carbonate solution, aqueous ammonia and an aqueous tetramethylammonium hydroxide solution at a temperature of 25° C. or more and 150° C. or less for 0.5 hours or more and 24 hours or less to increase surface area and affinity with soil, thereby obtaining a hydrophilized lignocellulosic biomass having a lignin content of 40% by mass or more and 60% by mass or less and a contact angle with water of 50° or less,
cultivating the plant in a soil containing a plant growth promoter comprising the hydrophilized lignocellulosic biomass, and
aggregating the soil to obtain a soil granulated material.

2. The method for growing a plant according to claim 1, wherein the plant growth promoter is added to the soil before sowing.

3. The method for growing a plant according to claim 1, wherein the plant growth promoter is mixed into the soil or sprayed onto the soil.

4. The method for growing a plant according to claim 1, wherein the plant growth promoter is added, in terms of the hydrophilized lignocellulosic biomass, in an amount of 0.0001 parts by mass or more and 10 parts by mass or less per 100 parts by mass of the soil for cultivating the plant.

5. The method for growing a plant according to claim 1, wherein the plant growth promoter is sprayed, in terms of the hydrophilized lignocellulosic biomass, in an amount of 0.2 kg or more and 20,000 kg or less per 10a of the soil for cultivating the plant.

6. The method for growing a plant according to claim 1, wherein the plant is an agricultural crop.

7. The method for growing a plant according to claim 1, wherein the plant is a plant selected from the group consisting of Cucurbitaceae, Solanaceae, Rosaceae, Malvaceae, Leguminosae, Gramineae, Brassicaceae, Alliaceae, Amaryllidaceae, Compositae, Amaranthaceae, Umbelliferae, Zingiberaceae, Lamiaceae, Araceae, Convolvulaceae, Dioscoreaceae, and Nelumbonaceae.

8. The method for growing a plant according to claim 1, wherein the plant is a plant selected from the group consisting of a fruit vegetable, a leaf vegetable, a root vegetable, rice, a wheat variety, and a flower.

9. The method for growing a plant according to claim 1, wherein the hydrophilized lignocellulosic biomass is a biomass from a Palmae plant.

10. The method for growing a plant according to claim 1, wherein the hydrophilized lignocellulosic biomass is a biomass from palm kernel shells.

11. The method for growing a plant according to claim 1, wherein the hydrophilized lignocellulosic biomass has an average particle size of 1,000 μm or less.

\* \* \* \* \*